United States Patent
Levy

[11] 3,875,078
[45] Apr. 1, 1975

[54] CATALYST FOR OXIDATION OF OLEFINS

[75] Inventor: Leon B. Levy, Corpus Christi, Tex.

[73] Assignee: Celanese Corporation, New York, N.Y.

[22] Filed: May 24, 1973

[21] Appl. No.: 363,450

Related U.S. Application Data

[62] Division of Ser. No. 225,536, Feb. 15, 1972, Pat. No. 3,755,434.

[52] U.S. Cl. ............................................. 252/432
[51] Int. Cl. ............................................. B01j 11/82
[58] Field of Search .................. 252/432, 439, 470; 260/533 N

[56] References Cited
UNITED STATES PATENTS

| | | | |
|---|---|---|---|
| 3,098,102 | 7/1963 | Bethell et al. | 260/533 N X |
| 3,240,806 | 3/1966 | Bethell et al. | 252/439 X |
| 3,271,447 | 9/1966 | Naylor | 252/470 X |
| 3,347,899 | 10/1967 | Caporali et al. | 252/439 X |
| 3,451,946 | 6/1969 | Ziegler et al. | 252/439 |
| 3,578,707 | 5/1971 | Bethell et al. | 260/533 N X |
| 3,641,138 | 2/1972 | Ondrey et al. | 252/439 |
| 3,655,747 | 4/1972 | Sennewald et al. | 252/470 X |
| 3,655,749 | 4/1972 | Ondrey et al. | 252/439 X |
| 3,655,750 | 4/1972 | Ondrey et al. | 252/439 X |
| 3,668,147 | 6/1972 | Yoshino et al. | 252/439 X |

*Primary Examiner*—H. Sneed
*Attorney, Agent, or Firm*—Stewart N. Rice; Ralph M. Pritchett

[57] ABSTRACT

A process for the oxidation of olefins to the corresponding unsaturated aldehydes and acids, e.g. propylene to acrolein and acrylic acid, by reacting the olefin with oxygen in the presence of a catalyst of the empirical formula

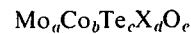

$$Mo_a Co_b Te_c X_d O_e$$

wherein X is rhodium or boron. When $a$ is 100, $b$ is 40–200, $c$ is 0.1–7.0 and $d$ is 5–75 when X is rhodium and is 0.1 to 3.0 when X is boron.

6 Claims, No Drawings

CATALYST FOR OXIDATION OF OLEFINS

This is a division of application Ser. No. 225,536, filed Feb. 15, 1972.

BACKGROUND OF THE INVENTION

The present invention relates to a method for the oxidation of olefins to the corresponding unsaturated aldehydes and unsaturated carboxylic acids, and to a catalyst therefor.

Numerous methods are known in the prior art for the oxidation of olefins to oxygenated products such as unsaturated aldehydes and acids. For example propylene may be oxidized to produce acrolein and acrylic acid. Among the catalysts known for effecting such conversions is cobalt molybdate mixed with tellurium dioxide or tellurium. Even though these and other catalysts are effective in olefin oxidation processes, they generally do not give good selectivity to the desired unsaturated aldehyde and acid products and many of them also fail to give adequate conversions. As used herein the terms "conversion" and "selectivity" are defined as follows:

$$\text{Conversion, \%} = \frac{\text{moles olefin converted}}{\text{moles olefin fed}} \times 100$$

$$\text{Selectivity, mole \%} = \frac{\text{moles of desired product}}{\text{moles olefin converted}} \times 100$$

$$\text{Total useful selectivity} = \text{unsaturated aldehyde selectivity} + \text{unsaturated acid selectivity}$$

It is thus an object of the present invention to provide a process for the oxidation of olefins, particularly propylene, which will give high total useful selectivity to the corresponding unsaturated aldehydes and carboxylic acids, such as acrolein and acrylic acid. It is another object of the present invention to provide a novel catalyst composition which may be utilized in an olefin oxidation process.

SUMMARY

The present invention in one of its embodiments is a process by which an olefin may be oxidized to produce the corresponding ethylenically unsaturated aldehyde and carboxylic acid, said process comprising reacting in the gas phase said olefin with oxygen in the presence of a catalyst of the empirical formula $$Mo_aCo_bTe_cX_dO_e$$

wherein X is boron or rhodium and wherein the atomic ratio of Mo:Co:Te:X:O is such that when $a$ is 100, b is 40–200, c is 0.1–7.0, d is either 5–75 when X is boron or 0.1–3.0 when X is rhodium, and e is 300–900. In another aspect the present invention is said catalyst of the formula $$Mo_aCo_bTe_cX_dO_e$$

DESCRIPTION OF THE PREFERRED EMBODIMENTS

The novelty of the present invention resides mainly in the catalyst which differs from the above-mentioned cobalt molybdate-tellurium or tellurium dioxide catalyst in having either rhodium or boron present. It has been found that the presence of the rhodium or the boron enables one to obtain a greater total useful selectivity to desirable unsaturated aldehyde and unsaturated carboxylic acid products and in some cases also enables one to obtain higher conversions of the olefin to oxygenated products. When the catalyst contains boron, that is when the catalyst is of the formula $Mo_aCo_b$-$Te_cB_dO_e$, it is preferred that the elements of the catalyst be present in atomic ratios such that when $a$ is 100, $b$ is 50–150, $c$ is 0.2–5.0, $d$ is 10–50 and $e$ is 350–700. However when the catalyst contains rhodium and is thus of the empirical formula $Mo_aCo_bTe_cRh_dO_e$, the atomic ratio of the elements is preferably such that when $a$ is 100, $b$ is 50–150, $c$ is 0.2–6.0, $d$ is 0.15–2.0, and $e$ is 350–700.

The exact structure of the catalysts of the present invention is not known but they may be considered as a mixture of the oxides of the various metals and/or as true compounds of a coordinate complex structure. For example the catalyst might be considered as a mixture of cobalt molybdate with tellurium oxide and either a rhodium or boron oxide. Various methods can be utilized for forming the catalyst which may be supported or unsupported. The starting materials may be dry blended or may be combined in the form of aqueous solutions or as aqueous slurries. The dry blending is the least preferable method because of the difficulty in obtaining uniformity throughout the catalyst.

A general method for forming the catalyst is to calcine a solid obtained by combining cobalt molybdate, a tellurium oxide and a boron or rhodium compound, which compound may be an oxide or a compound convertible to the oxide. Specifically the formation of catalysts may be accomplished by forming an aqueous solution of a rhodium or boron compound (such as rhodium nitrate, rhodium trichloride or boric acid) and adding thereto the requisite amount of water insoluble tellurium dioxide so as to form a slurry. This slurry is then combined with cobalt molybdate or an aqueous slurry thereof and blended thoroughly. The liquid is then evaporated from the blend so as to leave a solid which is calcined at about 200° to 600°C. The catalyst is preferably granulated or pelleted before use in an oxidation process and this may be accomplished either before or after calcining. In the foregoing procedure an aqueous slurry of a water-insoluble rhodium or boron compound, such as rhodium oxide or boric oxide, can be utilized instead of the aqueous solution of the rhodium trichloride or boric acid. Also a solution of a water soluble tellurium compound can be utilized such as an aqueous solution of ammonium tellurate.

If the catalyst is to be supported an aqueous slurry of the support can be blended with the slurry containing the catalyst components before evaporation and calcining. Other methods for loading the catalyst on a support will also be obvious. Suitable supports include silica, alumina, silicon carbide, alumina-silica, titania, charcoal, clays, and the like.

The cobalt molybdate for use in such catalyst preparations may be obtained in known manner such as by combining a solution of ammonium molybdate with a solution of a cobalt salt, adding ammonia, and then filtering, and drying the precipitate. Preferably the cobalt molybdate is granulated before admixing with the other catalyst components.

The process of the present invention may be carried out continuously or non-continuously and the catalyst may be present in various forms such as in fixed beds or as a fluidized system. Portions of the reactants, which do not undergo reaction may be recycled if desired. Where it is desired to produce an unsaturated acid as the ultimate product, the unsaturated aldehyde produced in the oxidation process may be separated from the effluent and be either recycled to the reaction zone or passed to a second stage oxidation zone.

The temperature utilized in the oxidation process should generally be between about 250° to 550°C although the exact temperature utilized in a particular situation will depend largely on the desired product composition. When high selectivity to an unsaturated carboxylic acid is desired then higher temperatures on the order of 350° to 550°C will usually be used and when it is desired to increase the selectivity to an unsaturated aldehyde lower temperatures on the order of 250° to 500°C will usually be used.

The pressure utilized in the process of the present invention may be subatmospheric, atmospheric or superatmospheric and should be between about 0.5 and 3.0 atmospheres for best results, although pressures ranging up to 7.0 atmospheres and higher may be suitably employed. The contact time of the reactants with the catalyst at the reaction conditions should generally be between about 0.1 and 15 seconds but is preferably a time within the range of 0.5 to 10 seconds. As used herein the term contact time refers to the contact time adjusted to 25°C and atmospheric pressure (conditions denoted by NTP). Thus the contact time is calculated by dividing the volume of the catalyst bed (including voids) by the volume per unit time flow rate of the reactants at NTP.

The oxygen necessary as a reactant in the present process may be from concentrated molecular oxygen or may be from a more dilute oxygen-containing gas wherein the molecular oxygen is mixed in varying amounts with an inert diluent gas such as nitrogen, argon, or carbon oxides. For instance air may be utilized as the source of oxygen. The olefin and/or oxygen-containing gas may be separately introduced into the reaction zone at one or a plurality of points along the length of the reaction zone or may be premixed before entering the reaction zone. However the contact of the olefin and the oxygen-containing charge are preferably kept to a minimum before entering the reaction zone. The reactants may be pretreated before entering the reaction zone such as for the removal of undesirable components therefrom.

In conducting the oxidation reaction, the gaseous feed mixture should generally contain from about 0.5 to 7.0 moles of oxygen per mole of the olefin although the preferable range is from 1.0 to 5.5 moles per mole. Although it is not required, water is also desirably present in the gaseous feed in amounts of from 1.5 to 15, preferably 5.0 to 12 moles per mole of unsaturated hydrocarbon. Care should be taken to avoid contacting the catalyst with liquid water during operation. In addition to water, diluents which are gaseous under the reaction conditions and are relatively inert may be introduced into the system. Suitable diluents include $CO_2$, nitrogen and flue gas as well as paraffinic hydrocarbons such as are frequently present in commercially-available propylene and isobutylene, for example mixtures of propane and propylene obtained from cracking units.

The olefins that may be oxidized in accordance with the present invention are preferably α-olefins, especially those of 3 to 5 carbon atoms. The present process is best suited for the oxidation conversion of propylene and isobutylene.

The following examples are given in order to illustrate the present invention.

Preparation of Cobalt Molybdate

Ammonium molybdate tetrahydrate (353 g) was dissolved in 400 cc of water containing 165 cc concentrated ammonia. A solution of 582 g cobalt nitrate hexahydrate in 700 cc water was slowly added to the molybdate solution at 60°C. The mixture was allowed to stand overnight after which the supernatent liquid was decanted. The precipitate was washed three times with 600 cc portions of water. It was then dried at 110°C, the weight of dry material being 421 g.

Preparation of Catalyst "A"

Cobalt molybdate (30.0 g) and 0.15 g of tellurium dioxide were blended together using 100 cc of water as the dispersant. The slurry was evaporated to dryness and the resulting solid calcined at 400°C for 16 hours. The catalyst was comminuted to from 20 to 30 mesh, U.S. The catalyst can be represented by the empirical formula $Co_{83}Mo_{100}Te_{0.65}O_{467}$.

Preparation of Catalyst "B"

Cobalt molybdate (30.0 g), 0.15 g rhodium trichloride trihydrate and 0.60 g of tellurium dioxide were blended together using 100 cc water as dispersant. The slurry was evaporated to dryness and the resulting solid calcined at 400°C for 16 hours. The catalyst was comminuted to from 20 to 30 mesh, U.S. The catalyst can be represented by the empirical formula $Co_{83}Mo_{100}Te_{2.6}Rh_{0.40}O_{472}$.

Preparation of Catalyst "C"

To 29.7 g of Catalyst A was added 2.97 g of boric acid and the solids mixed by blending with 100 cc of water. The slurry was evaporated to dryness and the resulting solid calcined at 400°C for 16 hours. The catalyst was comminuted to from 20 to 30 mesh, U.S. The catalyst can be represented by the empirical formula $Co_{83}M_{100}Te_{0.65}B_{34}O_{518}$.

EXAMPLE I

Several runs were made in which rhodium-containing Catalyst B and prior art Catalyst A were utilized for the conversion of propylene to acrolein and acrylic acid. In all of these runs the catalyst was used in a U-tube fixed bed reactor, the U-tube having a total length of about 60 inches. The feed mixture consisting of propylene, air and water was premixed and preheated to the reaction temperature prior to introduction into the reactor. The components of the feed were present in amounts such that the molar ratio of propylene:oxygen:water was 1:3.6:9.4 and the contact time in all the runs was 1.8 seconds (NTP). In order to compare Catalyst A to rhodium-containing Catalyst B at similar propylene conversions the temperature was adjusted in each run to that indicated in the following table summarizing the results.

| Catalyst | B | A | B | A | B | A |
| --- | --- | --- | --- | --- | --- | --- |
| Temperature, °C | 375 | 350 | 399 | 375 | 448 | 400 |
| Propylene conversion, % | 47 | 46 | 79 | 79 | 90 | 95 |
| Acrolein selectivity, mol % | 67 | 50 | 41 | 25 | 30 | 7 |
| Acrylic acid selectivity, mol % | 26 | 35 | 45 | 51 | 38 | 45 |
| Total useful selectivity, mol % | 93 | 85 | 86 | 76 | 68 | 52 |

EXAMPLE II

The following table summarizes the results obtained with boroncontaining Catalyst C, and for comparison Catalyst A at similar propylene conversions. The apparatus, feeds and contact times were the same as in Example I.

| Catalyst | C | A | C | A |
| --- | --- | --- | --- | --- |
| Temperature, °C | 400 | 375 | 425 | 400 |
| Propylene conversion, % | 86 | 85 | 95 | 95 |
| Acrolein selectivity, mol % | 20 | 11 | 9 | 7 |
| Acrylic acid selectivity, mol % | 58 | 52 | 51 | 45 |
| Total useful selectivity, mol % | 78 | 63 | 60 | 52 |

The embodiments of the invention in which an exclusive property or privilege is claimed are defined as follows:

1. A catalyst composition of the empirical formula $Mo_aCo_bTe_cX_dO_e$ wherein X is boron or rhodium and wherein the atomic ratio of Mo:Co:Te:X:O is such that when $a$ is 100, $b$ is 40–200, $c$ is 0.1–7.0, $d$ is either 5–75 when X is boron or 0.1–3.0 when X is rhodium, and $e$ is 300–900.

2. A catalyst composition of claim 1 wherein X is boron.

3. A catalyst composition of claim 2 wherein the elements of said catalyst are present in atomic ratios such that when $a$ is 100, $b$ is 50–150, $c$ is 0.2–5.0, $d$ is 10–50, and $e$ is 350–700.

4. A catalyst composition of claim 1 wherein X is rhodium.

5. A catalyst composition of claim 4 wherein the elements of said catalyst are present in atomic ratios such that when $a$ is 100, $b$ is 50–150, $c$ is 0.2–6.0, $d$ is 0.15–2.0, and $e$ is 350–700.

6. The catalyst composition of claim 1 wherein said catalyst composition is unsupported.

* * * * *